United States Patent
Carviel

(12) 
(10) Patent No.: US 6,678,995 B1
(45) Date of Patent: Jan. 20, 2004

(54) FLYING INSECT CONTROL DEVICE

(76) Inventor: Jeff Carviel, 545 Stoney Creek Rd., York (CA), N0A 1R0

( * ) Notice: Subject to any disclaimer, the term of this patent is extended or adjusted under 35 U.S.C. 154(b) by 0 days.

(21) Appl. No.: 10/316,063

(22) Filed: Dec. 11, 2002

Related U.S. Application Data

(60) Provisional application No. 60/348,385, filed on Jan. 16, 2002.

(51) Int. Cl.$^7$ ................................................. A01M 1/20
(52) U.S. Cl. ............................ 43/131; 43/132.1; 43/107
(58) Field of Search ........................ 43/124, 131, 132.1, 43/107, 119, 122

(56) References Cited

U.S. PATENT DOCUMENTS

| | | | | |
|---|---|---|---|---|
| 239,503 A | * | 3/1881 | Ivey | 449/22 |
| 805,015 A | * | 11/1905 | Hazelrigg | 43/119 |
| 1,267,237 A | * | 5/1918 | Little | 43/119 |
| 2,087,164 A | * | 7/1937 | Purifoy | 43/124 |
| 3,643,371 A | * | 2/1972 | Gordon | 43/131 |
| 5,027,548 A | * | 7/1991 | Anderson | 43/131 |
| 5,979,108 A | * | 11/1999 | Adams | 43/121 |
| 6,079,151 A | * | 6/2000 | Bishoff et al. | 43/132.1 |
| 6,233,865 B1 | * | 5/2001 | Curtis et al. | 43/131 |

* cited by examiner

Primary Examiner—Charles T. Jordan
Assistant Examiner—Kimberly S. Smith

(57) ABSTRACT

The present invention a flying insect control device for placement over an entrance or exit way used by insects, said flying insect control device comprises a body having a first end defining a first opening and a second end defining a second opening, said openings connected with a passageway. It further includes a includes a flange connected proximate said second end of said body, said flange adapted for mounting said flying insect control device onto a flat surface over an insect entrance or exit way such that said passageway is in communication with said insect entrance or exist way; wherein said passageway dimensioned to compel flying insects to land at a landing area defined at said first end of said body and further compel insects to ambulate through said passageway laced with insecticide.

4 Claims, 16 Drawing Sheets

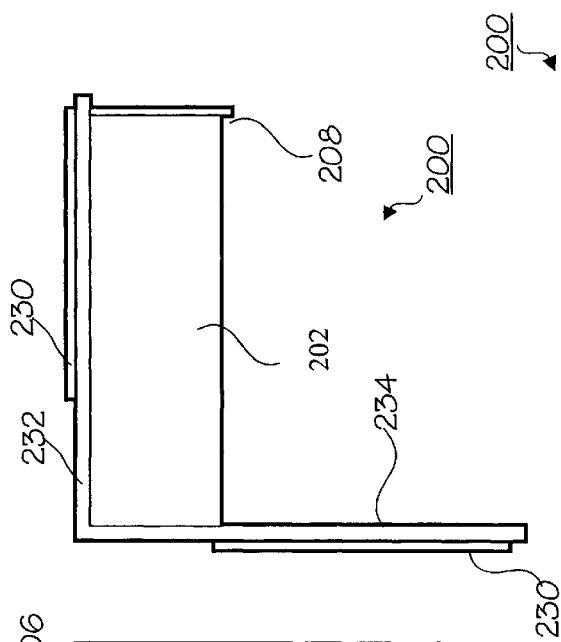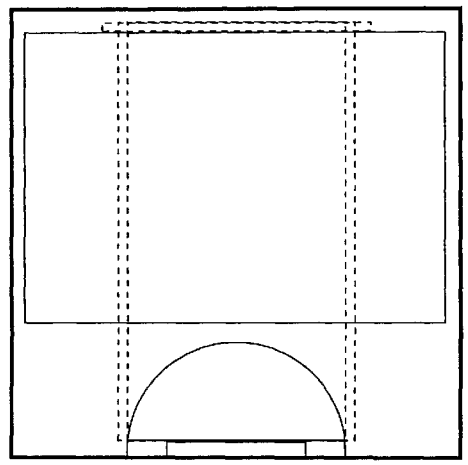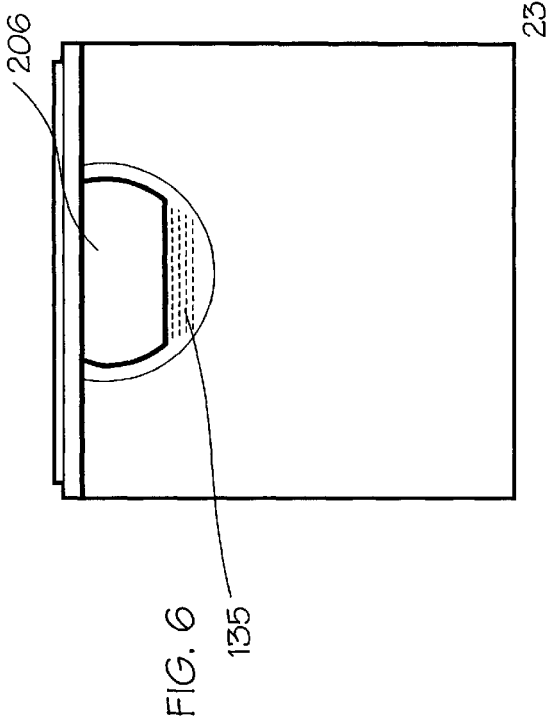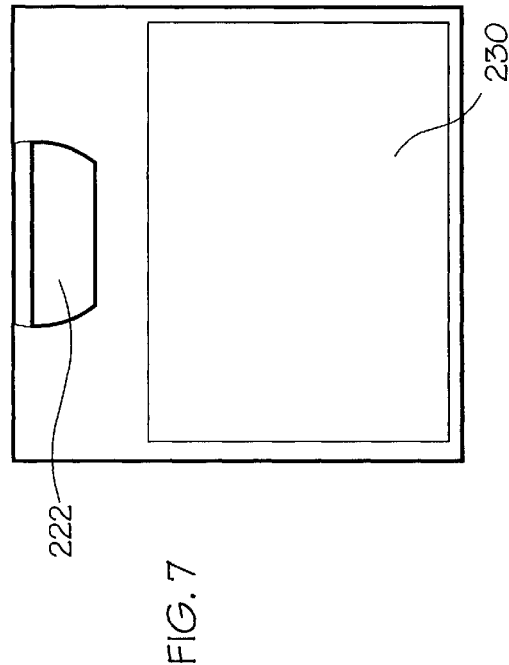

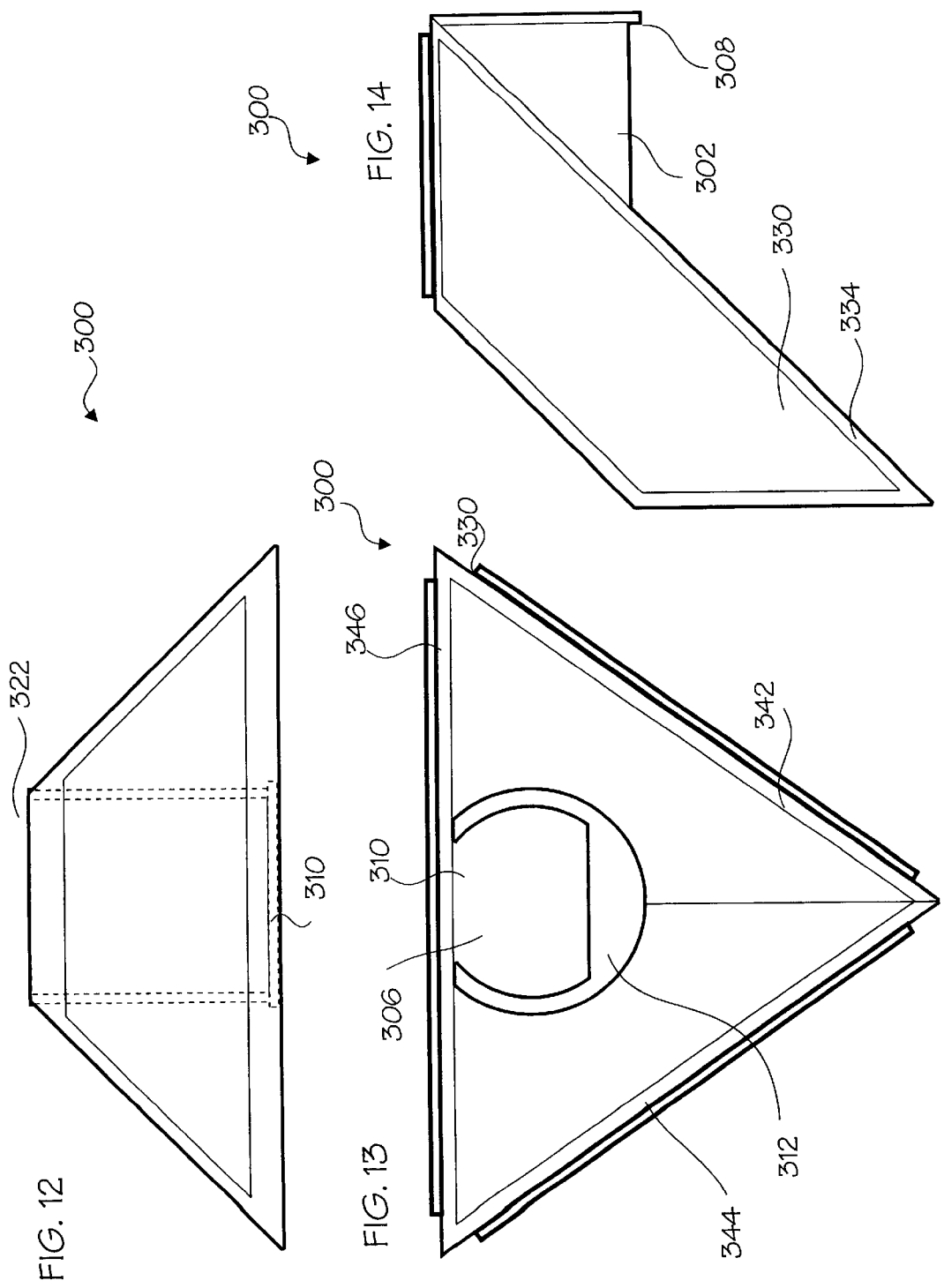

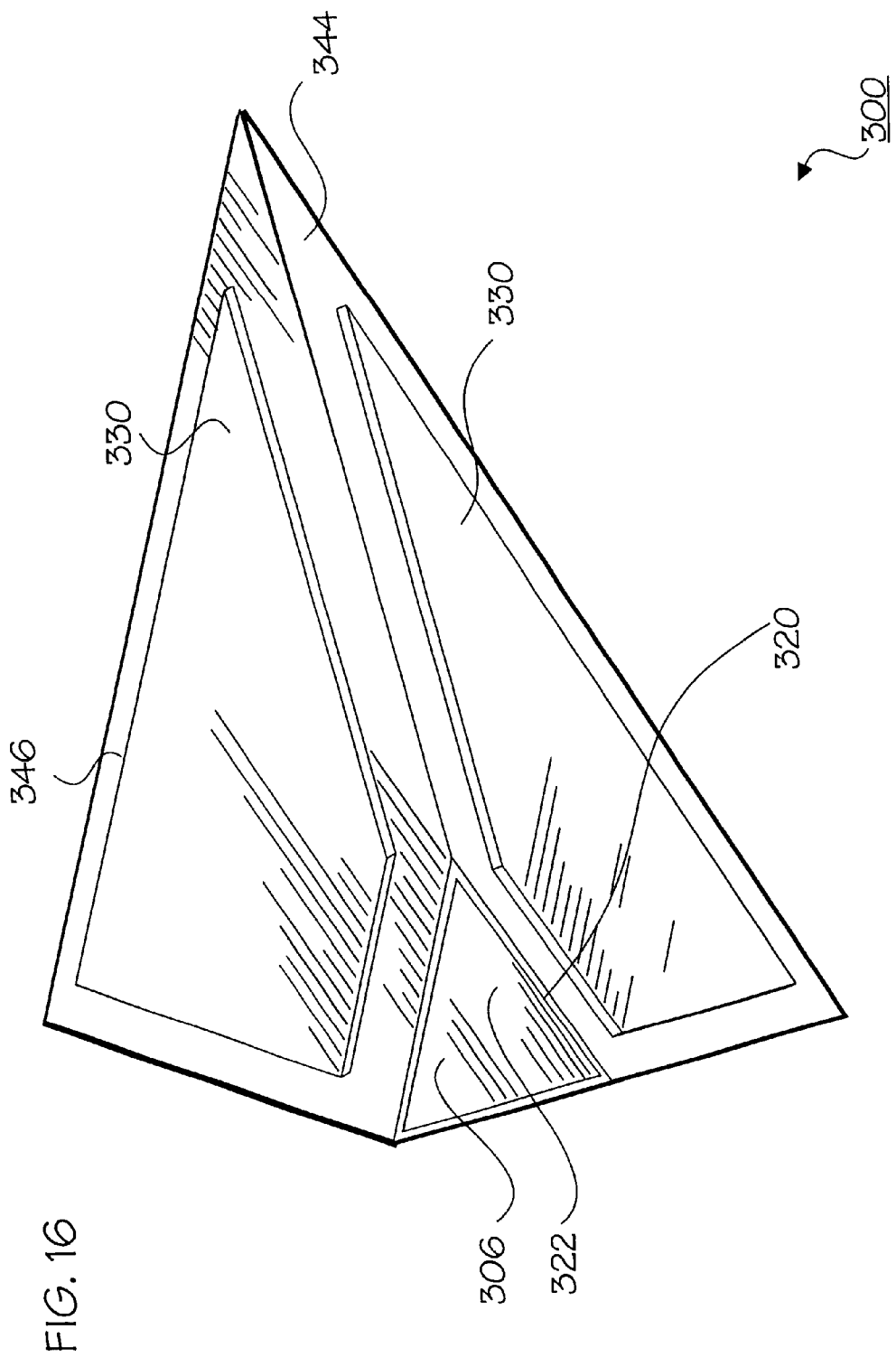

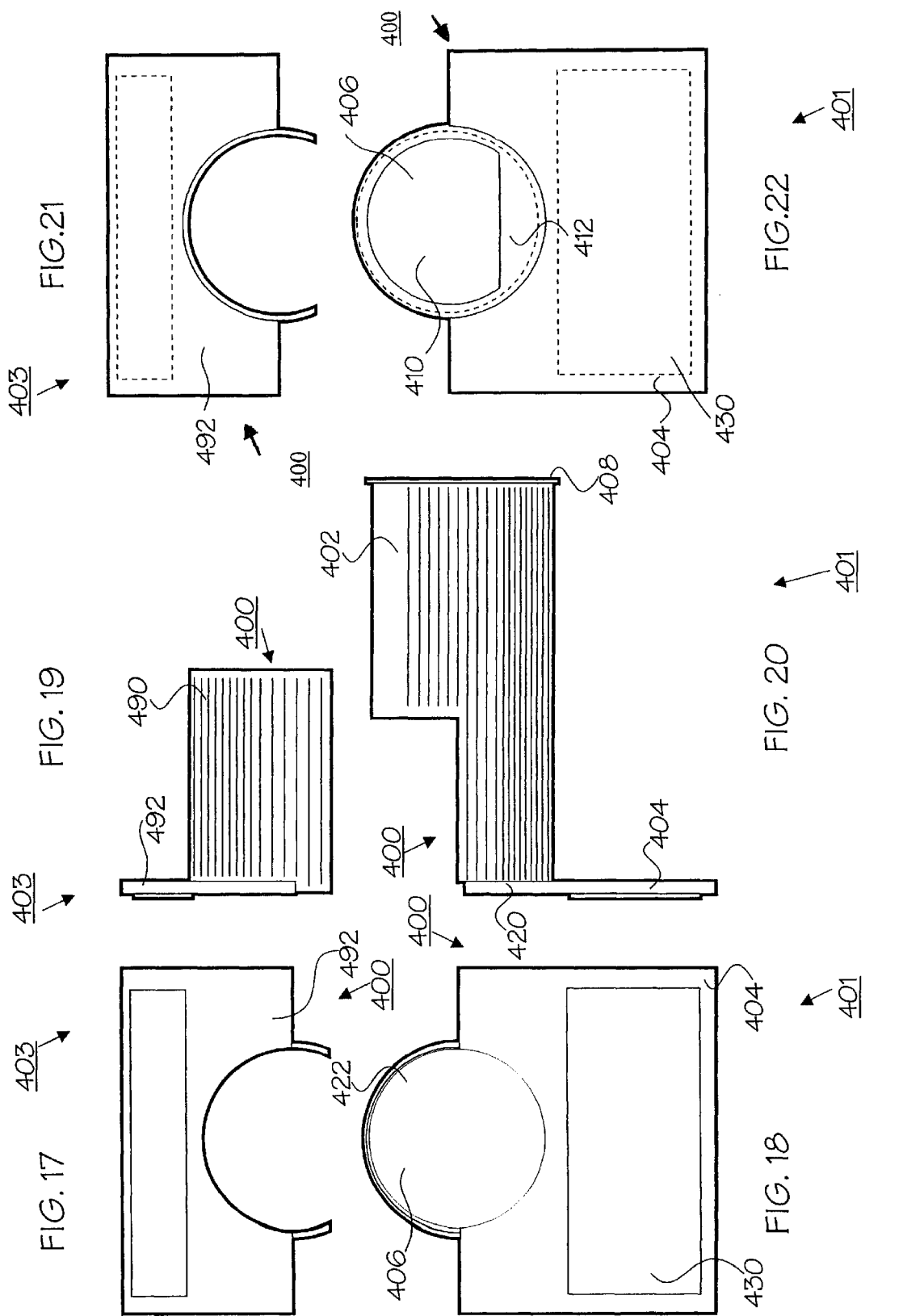

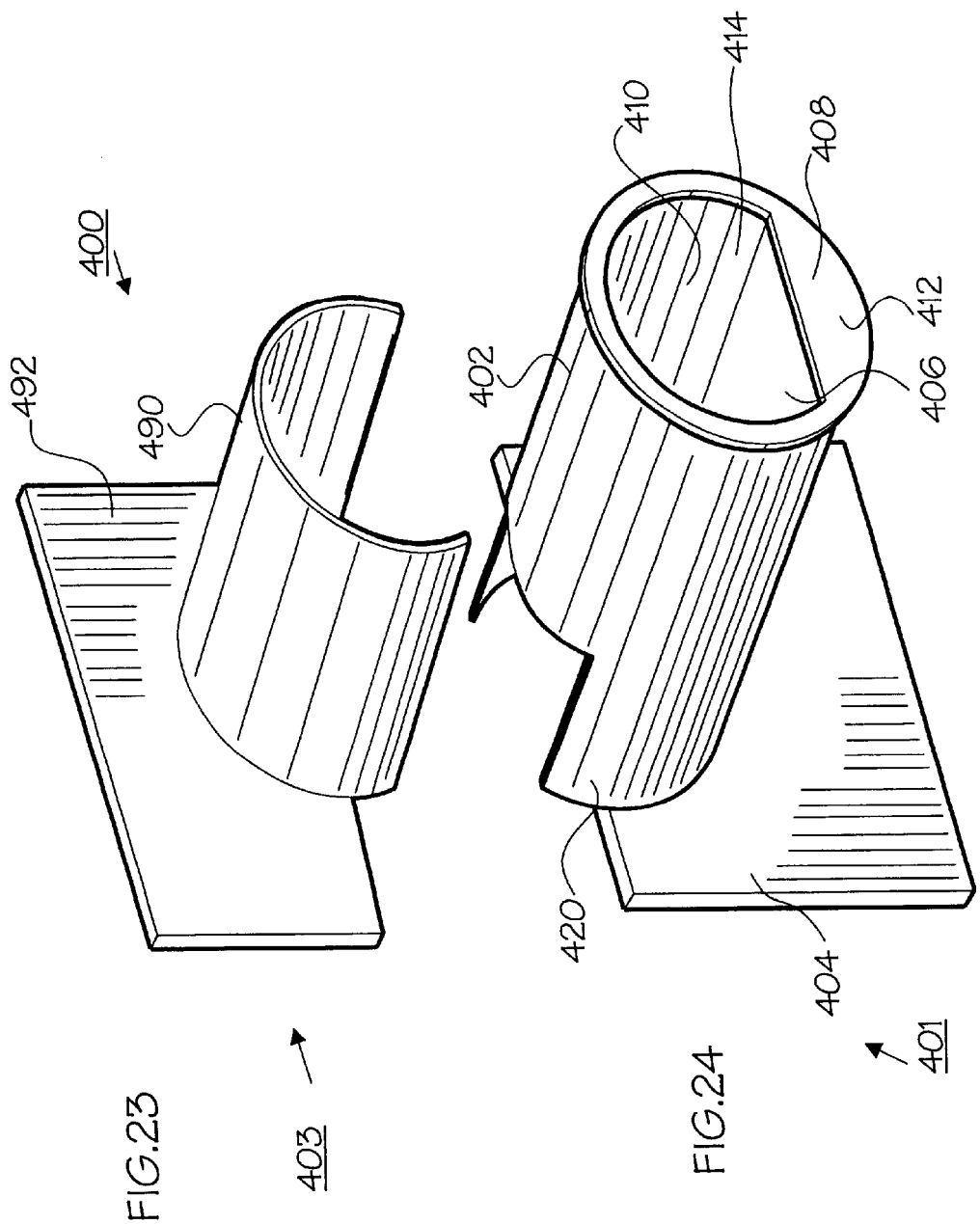

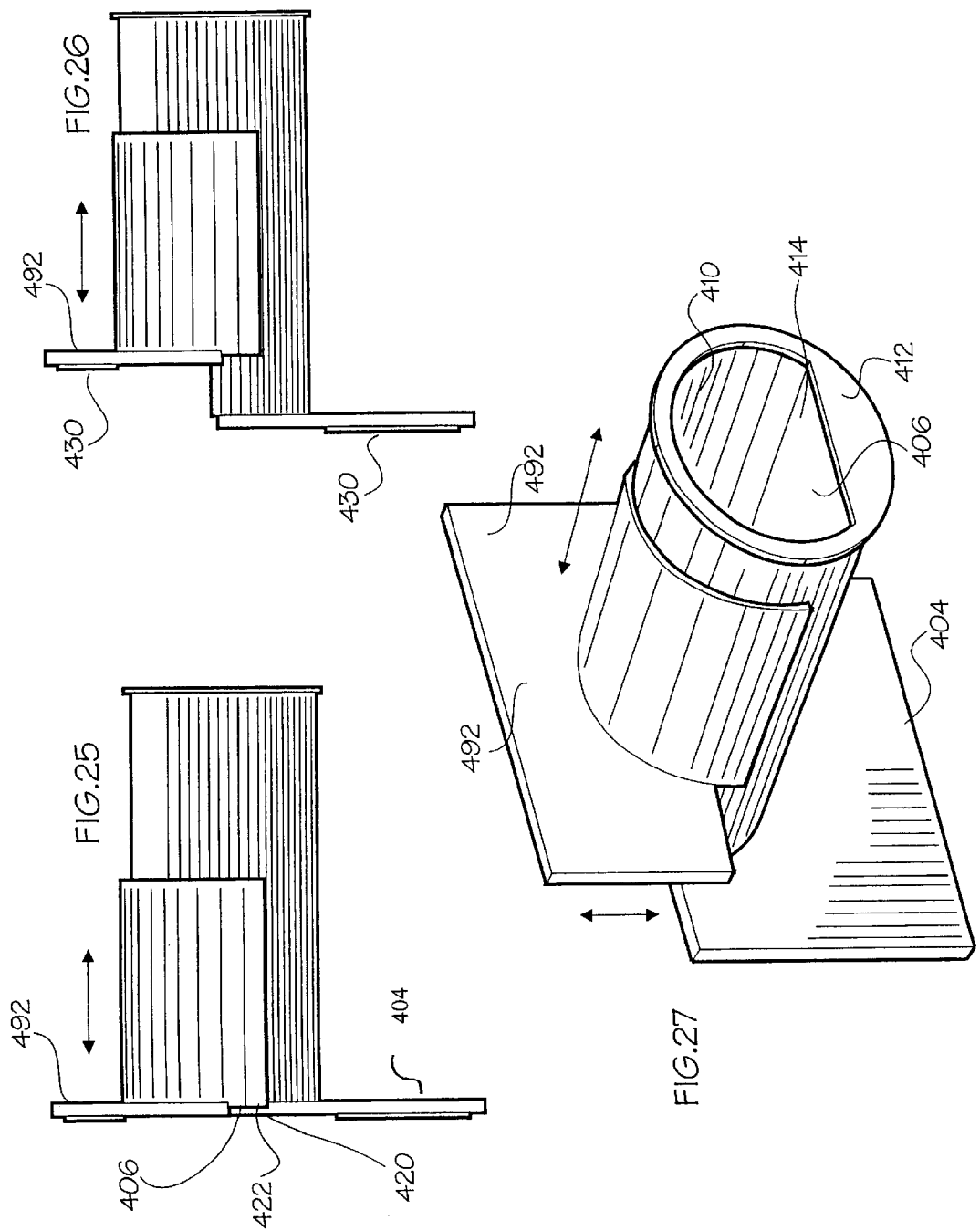

FLYING INSECT CONTROL DEVICE

This application claims the benefit of Provisional application Ser. No. 60/348,385, filed Jan. 16, 2002.

FIELD OF THE INVENTION

The present invention relates to insect control devices and more specifically to a flying insect control device.

BACKGROUND OF THE INVENTION

A number of devices for controlling insect populations are currently available in the market place and as well a number of these devices have been patented.

To date, the devices that have been patented can generally be classified into four categories, namely:
1. Devices dealing with creeping insects, most of which deal with ant traps.
2. Fly paper type traps that adhesively collect flying insects.
3. Bait stations and/or traps which are designed to attract insects to insecticides.
4. Insecticide delivery apparatus usually in the form of aerosol spray cans.

The above mentioned types of insect control devices all have their advantages and disadvantages and all are limited in their effectiveness in eradicating a particular insect population.

The present invention is designed to specifically target a particular group of insects by placing the present invention, namely a flying insect control device over the insect entrance and exit way thereby ensuring that a good percentage of the population of the insect nest will be exposed to the insecticide and therefore, the probability of eradicating the insect nest is extremely high.

Furthermore, it is a goal of the present invention to produce a device which is easily usable and functional and inexpensive to manufacture.

SUMMARY OF THE INVENTION

The present invention a flying insect control device for placement over an entrance or exit way used by insects, said flying insect control device comprises:
(a) a body having a first end defining a first opening and a second end defining a second opening, the openings connected with a passageway;
(b) a method of mounting the body over an insect entrance or exit way such that the passageway is in communication with the insect entrance or exit way; and
(c) the passageway dimensioned to compel flying insects to land at a landing area defined at the first end of the body and further compels insects to ambulate through the passageway laced with insecticide.

Preferably wherein the body includes a tubular section with first and second openings proximate each end respectively.

Preferably wherein the mounting method includes a flange connected proximate said second end of said body, said flange adapted for mounting said flying insect control device onto a flat surface.

Preferably wherein the body including a method of retaining said insecticide within said passageway.

Preferably wherein the mounting method includes a flange connected proximate the second end of the body, the flange adapted for mounting the flying insect control device into a corner where two walls intersect.

Preferably wherein the mounting method includes a flange connected proximate the second end of the body, the flange adapted for mounting the flying insect control device into a corner where three walls intersect.

Preferably wherein the mounting method includes a flange connected proximate the second end of the body, said flange adapted for mounting the flying insect control device onto two flat surfaces, the surfaces parallel but spaced apart from each other.

BRIEF DESCRIPTION OF THE DRAWINGS

FIG. 6 is a rear plan elevational view of the second flange of the second embodiment of the flying insect control device.

FIG. 7 is a top plan elevational view of the first flange area of the second embodiment of the flying insect control device.

FIG. 8 is a side elevational view of the second embodiment of the flying insect control device.

FIG. 9 is a top plan view of the second embodiment of the flying insect control device.

FIG. 12 is a top plan view of the third embodiment of the flying insect control device.

FIG. 13 is a front plan view of the flying insect control device.

FIG. 14 is a side elevational view of the third embodiment of the flying insect control device.

FIG. 16 is a rear schematic perspective view of the flying insect control device.

FIG. 17 is a rear elevational view of the upper section of the fourth embodiment of the flying insect control device.

FIG. 18 is a front plan elevational view of the lower section of the fourth embodiment of the flying insect control device.

FIG. 19 is a side plan view of the upper section of the fourth embodiment of the flying insect control device.

FIG. 20 is a side plan view of the lower section of the fourth embodiment of the flying insect control device.

FIG. 21 is a front plan elevational view of the upper section of the fourth embodiment of the flying insect control device.

FIG. 22 is a front plan view of the lower section of the fourth embodiment of the flying insect control device.

FIG. 23 is a front schematic perspective view of the upper section of the fourth embodiment of the flying insect control device.

FIG. 24 is a front schematic perspective view of the lower section of the fourth embodiment of the flying insect control device.

FIG. 25 is an assembly view of the upper section together with the lower section of the fourth embodiment of the flying insect control device with the upper section in the totally extended position.

FIG. 26 is a plan elevational view showing the assembly of the upper section 403 with the lower section 402 with the upper section partially retracted from the lower section 401 of the fourth embodiment of the flying insect control device.

FIG. 27 is a schematic front perspective view of the fourth embodiment of the flying insect control device.

DETAILED DESCRIPTION OF THE PREFERRED EMBODIMENT

First Embodiment

Referring first of all to FIGS. 1 through 5 and FIG. 28 which depict the first embodiment, the present invention a Flying Insect Control Device is shown generally as 100 in FIGS. 1 through 5 and 28.

Figure 3:
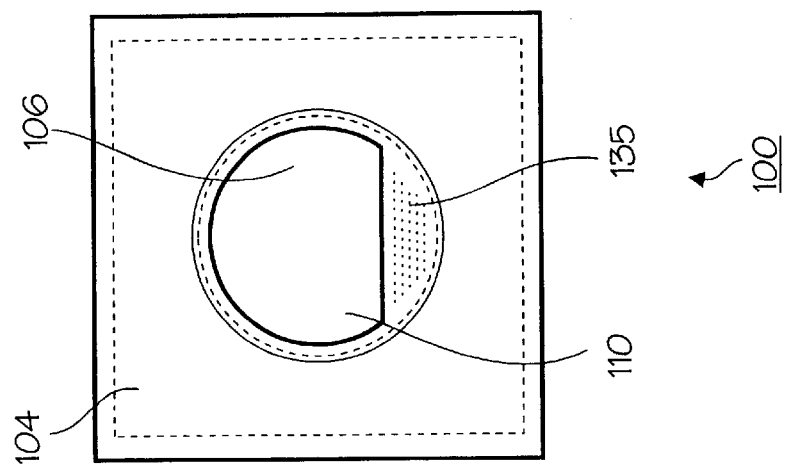
FIG. 3 is a front plan elevational view of the first embodiment of the flying insect control device.
Figure 2:
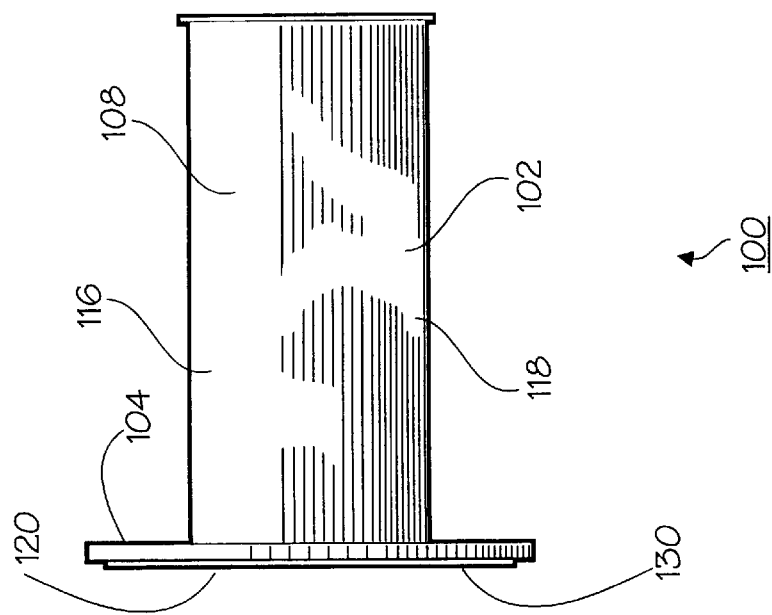
FIG. 2 is a side elevational view of the first embodiment of the flying insect control device.
Figure 1:
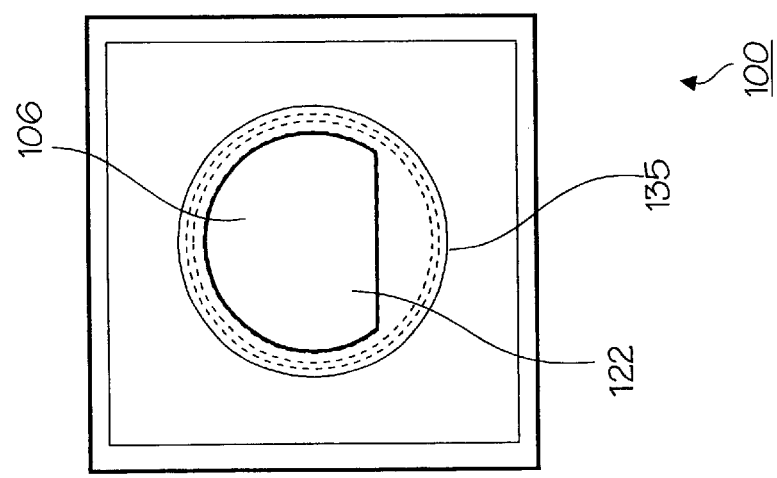
FIG. 1 is a rear plan elevational view of the first embodiment of the flying insect control device.
Figure 4:
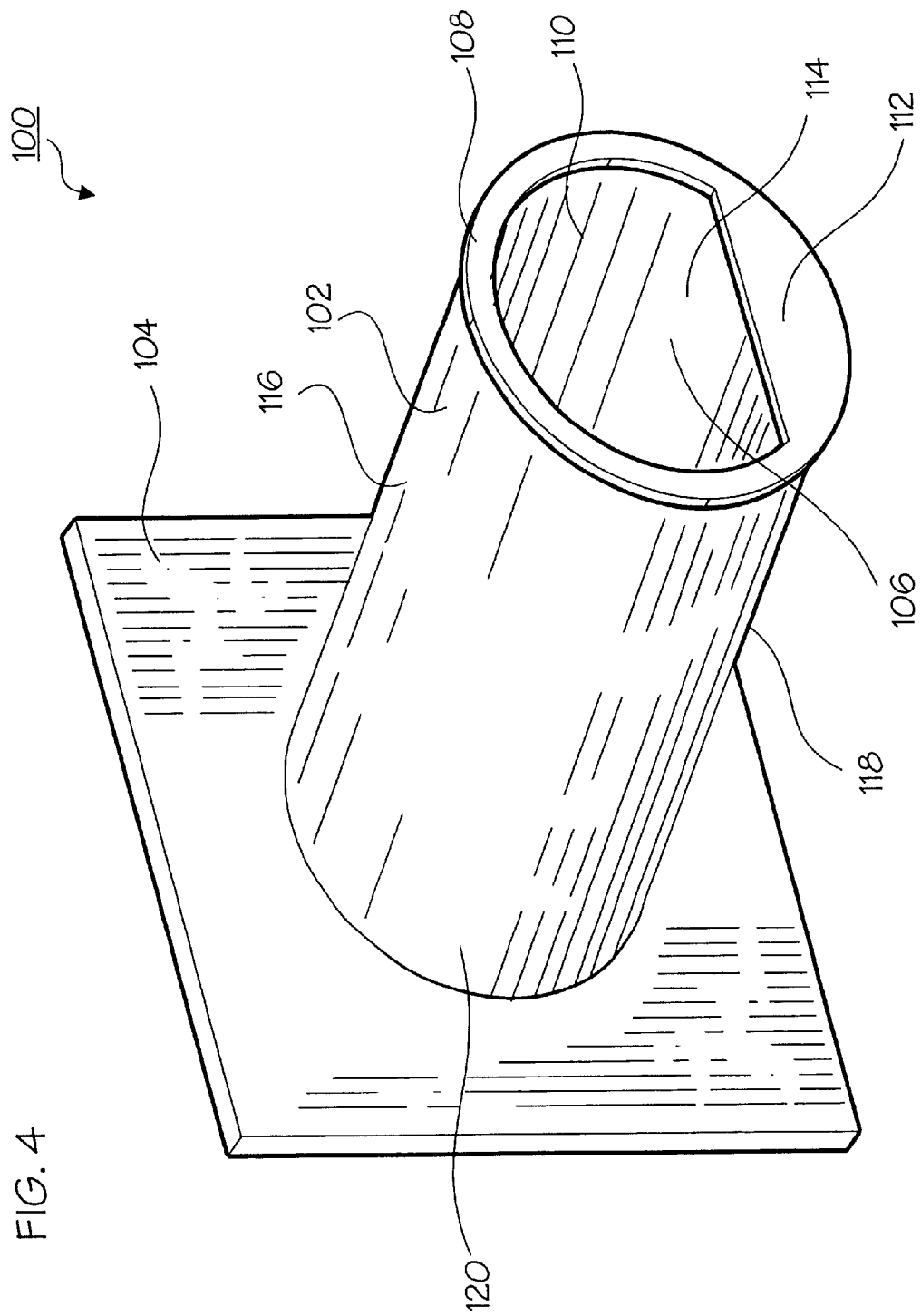
FIG. 4 is a front schematic perspective view of the first embodiment of the flying insect control device.

Referring now to FIG. 4, the present invention, flying insect control device 100 includes the following major components, namely body 102, flange 104, passageway 106, wherein body 102 having a first end 108, and defining a first opening 110 and having a lip 112 which is proximate to landing area 114. Body 102 includes a body top 116, a body bottom 118 and a second end 120.

Figure 5:
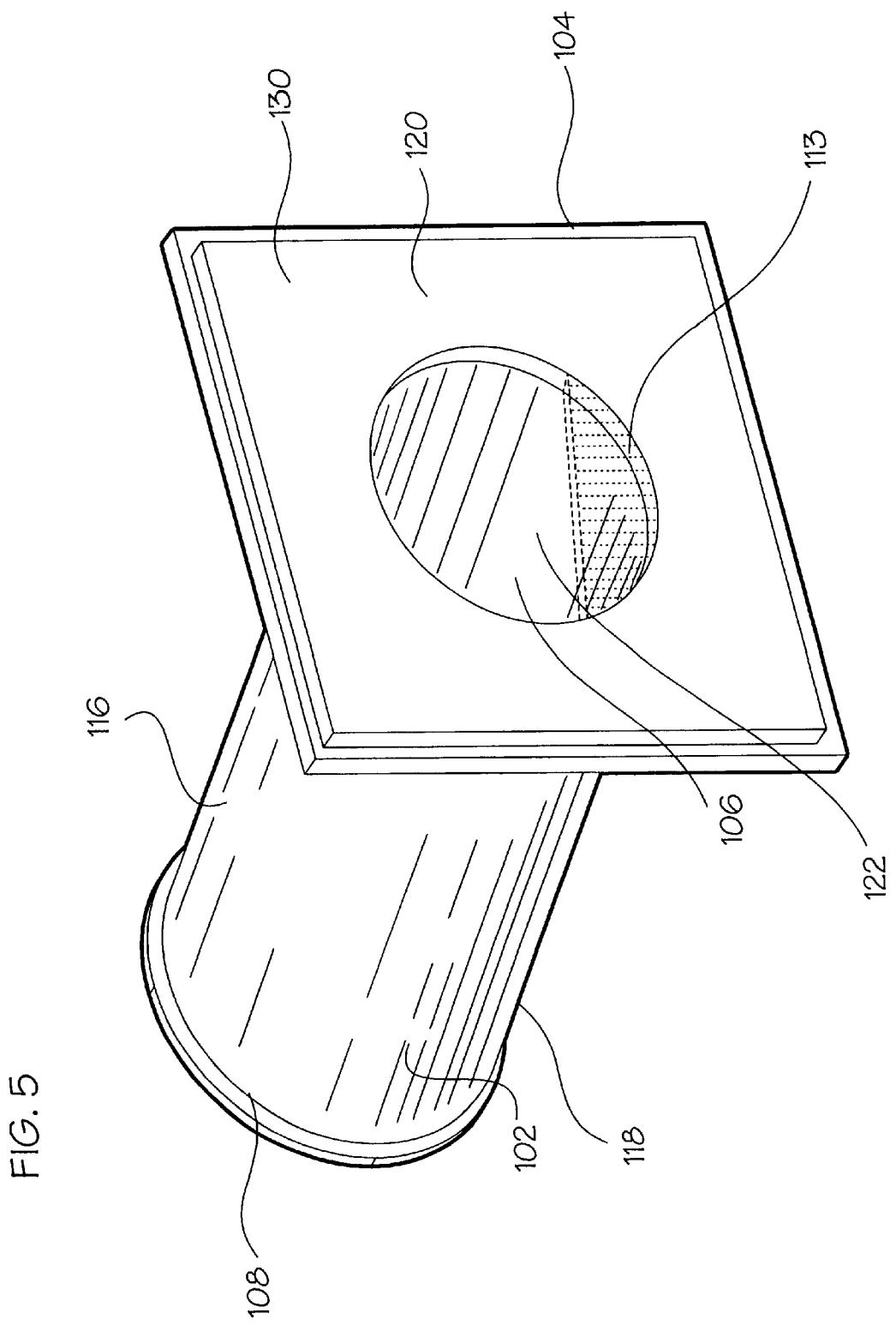
FIG. 5 is a rear schematic perspective view of the first embodiment of the flying insect control device.
Figure 10:
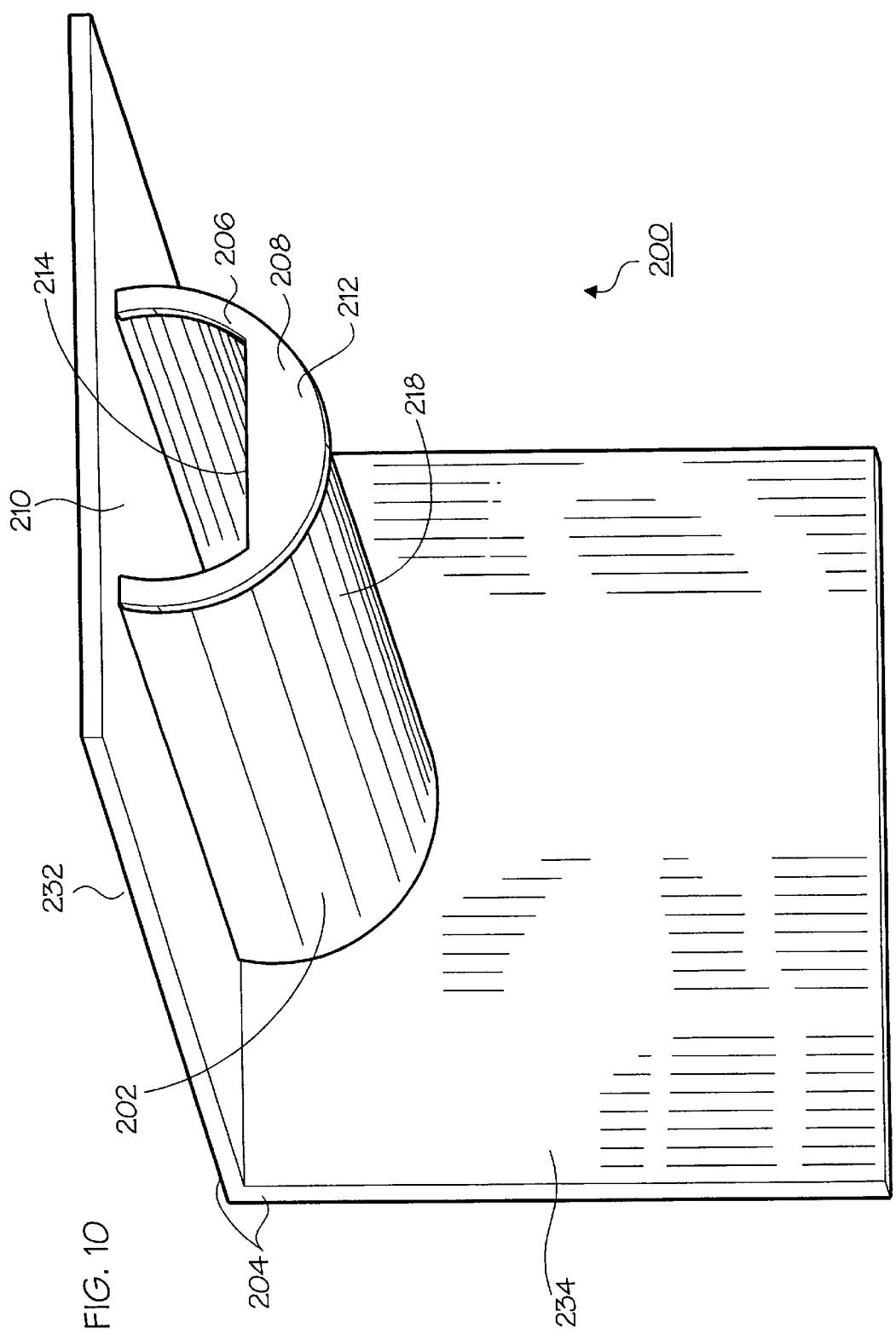
FIG. 10 is a front schematic perspective view of the second embodiment of the flying insect control device.

Referring now to FIG. 5, showing the flying insect control device 100 in a rear perspective view, flying insect control device 100 includes adhesive 130, second end 120 and a second opening 122.

Referring now to FIG. 1 through 5 particularly, flying insect control device 100 is comprised of two major components, namely body 102 which is rigidly attached to flange 104. Body 102 and flange 104 may in fact be one cohesive part or in fact they may be two separate components which are then assembled together. Body 102 which is preferably a cylindrical body includes a body top 116 and a body bottom 118. Body 102 has a first end 108 which defines an aperture or first opening 110 into which flying insects can fly into. Cylindrical body 102 defines there through a passageway 106 which is dimensioned to receive flying insects walking there through. Proximate first opening 110 is an area defined as the landing area 114 which is along the inside of body bottom 118 of body 102.

Body 102 further includes a second end 120 which defines a second aperture, namely second opening 122, such that an insect travelling through body 102 can enter through first opening 110, walk through passageway 106, then exit through second opening 122.

Flange 104 further includes an adhesive 130 which for example could be a foam back adhesive for mounting the entire flying insect control device 100 onto a wall or other flat surfaced area.

Further, flying insect control device 100 is coated with bait or insecticide 135, proximate the interior of body bottom 118 of body 102. Lip 112 is designed to retain insecticide 135 within the bottom of body 102 and in addition, lip 112 serves to constrict the size of first opening 110, thereby controlling the way in which flying insects enter through first end 108. Shown in dotted lines in FIG. 5, optionally there can be an additional lip 113 constricting the size of second opening 122, approximate second end 120 of body 102.

In Use

Figure 28:
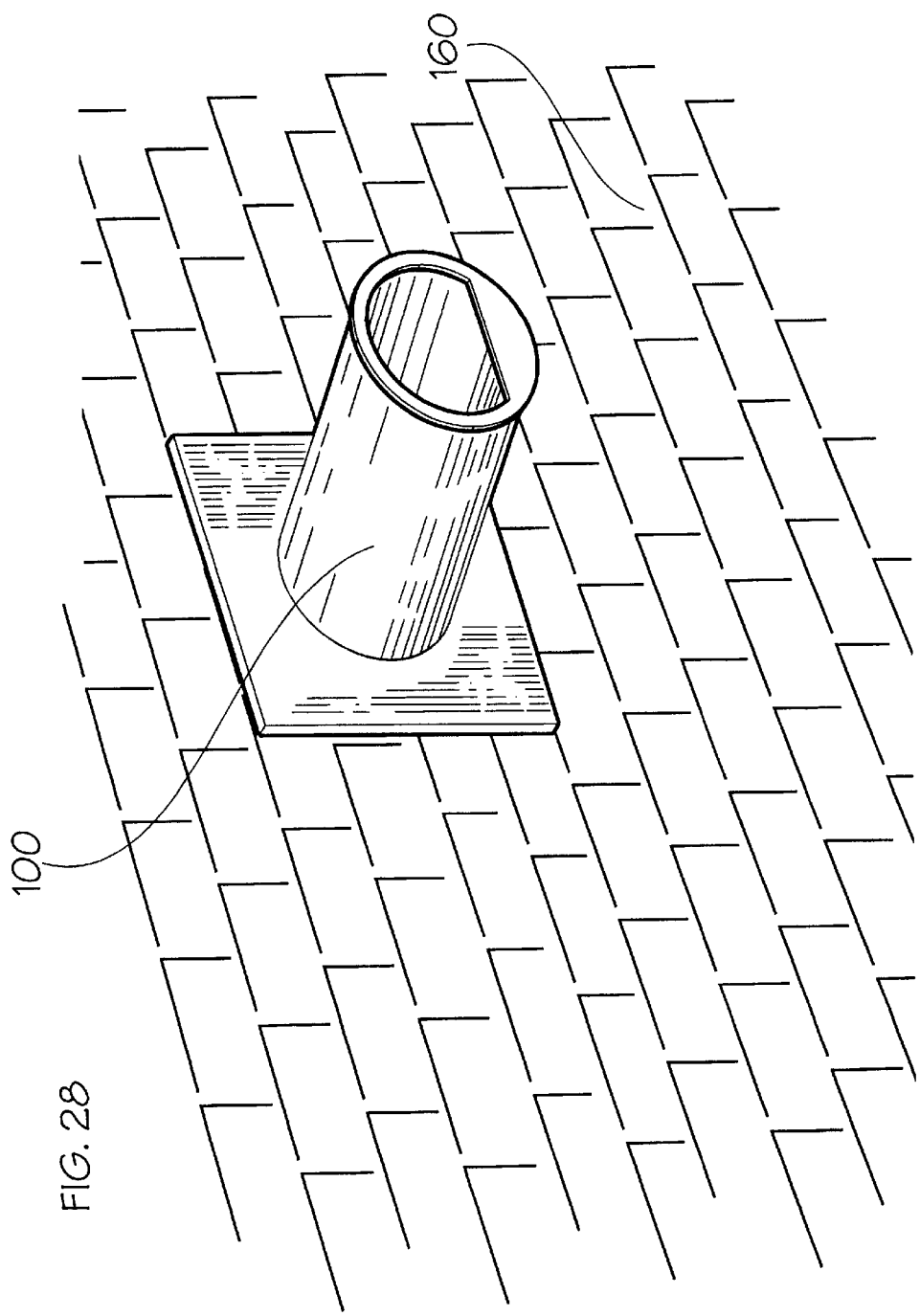
FIG. 28 is a front schematic perspective view of the first embodiment of the flying insect control device shown mounted on a brick wall.

Referring now to FIG. 28, which shows flying insect control device 100 mounted onto a brick wall surface 160. The second opening 122 which is not visible in FIG. 28 is mounted over an insect entry and exit hole which are normally visible to the human eye. Therefore, passageway 106 will communicate with the entry and exit hole of a species of insects which found their way through the brick wall surface 160, through what is usually a defect or hole in the overlying brick work. It is known that insects tend to find small entrance ways, cracks, holes and or other defects in brick work, siding and/or other areas of a house in order to penetrate into the interior walls or portions hidden from view of a house and will often build their nests inside or behind the exterior facia or walls of a home and enter and exit through a small opening or crack which is usually visible on the exterior surface of the house. Flying insect control device 100 is mounted onto brick wall surface 160 in such a manner that passageway 106 communicates with and is open to an insect passageway which is known to be used by insects such as yellow jackets, wasps, flies and the like. Flying insect control device 100 is attached to brick wall surface 160 in FIG. 28 preferably by using an adhesive 130 which is affixed onto the rear side of flange 104 of flying insect control device 100. Other suitable means known in the art for attaching flying insect control device 100 can also be used.

With flying insect control device 100 in position as shown in FIG. 28, over a insect entry and exit way which is not visible in FIG. 28, insects wishing to enter and exit into the nest which is normally located behind the front facia or walls of the home is forced to enter through first opening 110, of body 102 of flying insect control device 100. Experience has shown that placing flying insect control device 100 does not deter the insects from returning to an entry or exit that they have been accustomed to use and that they will find the entry and exit way despite the fact that flying insect control device 100 has been mounted in place over top of their entry or exit hole.

Therefore, flying insects such as yellow jackets, wasps etc., which are approaching flying insect control device 100 are forced to enter through first end 108 at body 102 through first opening 110. The diameter of cylindrical body 102 is designed such that the flying insects cannot fly through body 102, but rather must land on or near landing area 114 just behind lip 112 and must physically walk through passageway 106 defined by body 102. The bottom of body 102 is coated with insecticide 135 and preferably the insecticide is just located along the inside body bottom 118 of body 102, however it could also be spread throughout the entire interior of body 102 to ensure that good contact is made between the insecticide and the insect. The flying insect being forced to land on landing area 114 just inside first opening 110, then walks through passageway 106 making contact with insecticide 135 as it walks through passageway 106 and exits through second opening 122 of second end 120 and travels on through and into its nest behind brick wall surface 160. In this manner, the insect has not only contaminated itself with insecticide 135, but also carries the insecticide into the nest. Thereby other insects within the nest making contact with that insect would also be contaminated as well eggs, larva and other insects within the nest that make contact with that insect.

Conversely, once flying insect control device 100 is in place, the only way that flying insects can exit out of the hole which they are accustomed to exiting out of which is located in brick wall surface 160, is by walking out and passing through second opening 122 in second end 120 of body 102 and walking through passageway 106 until they reach landing area 114 and/or lip 112 at which time they can take flight and fly away from flying insect control device 100. Again body 102 is dimensioned so that a flying insect is comfortable walking through the tubular dimensions of body 102, however is not capable of flying the length of body 102. Body 102 is so dimensioned that it would very uncomfortable to fly the length of the passageway 106 defined in body 102. Once again as the flying insect walks along passageway 106 it picks up insecticide 135 and thereby contaminates itself and should it later return to the nest again will contaminate itself and anything else it comes in contact to in the nest.

Flying insect control device 100 could be manufactured of plastic, paper, cardboard and/or any other suitable material. The diameter of body 102 and the size of passageway 106 is determined by the size and flight patterns of the insect one wishes to control. After trial and error one is able to determine the interior diameter of body 102 which forces landing of flying insects onto landing area 114 and thereafter ambulating through passageway 106 until it reaches second opening 122, near second end 120 of body 102.

The following embodiments which will be described below are variations of the embodiment described herein. Essentially the modifications to the flying insect control device 100 which are explained and depicted in FIGS. 6 through 31 are modifications to the flying insect control device 100 which are required in order to position the device accurately over the insect entrance and exit way.

Second Embodiment

As second embodiment of the present invention is depicted in FIGS. 6 through 11 and FIG. 29. This embodiment is directed at an insect control device shown generally as 200 for placement over an insect entrance and exit way which is located at or near the apex of where for example a vertical wall and a horizontal wall meet. Also for example, where a left hand wall and right hand wall meet in vertical fashion in a side wall. This device can also be used where a wall and floor meet and where the insect entrance and exit way is located near the apex of the intersection of the two walls.

Referring now to FIGS. 6 through 11, flying insect control device shown generally as 200 includes the following major components, namely: body 202, L-shaped flange 204, passageway 206, wherein said body 202 has a first end 208 and together with first flange area 232 defines a first opening 210 and approximate first opening 210 a lip 212 and a landing area 214 just adjacent to lip 212. In addition, flying insect control device includes a body bottom 218 and L-shaped flange 204 includes a first flange area 232 and a second flange area 234.

Figure 11:
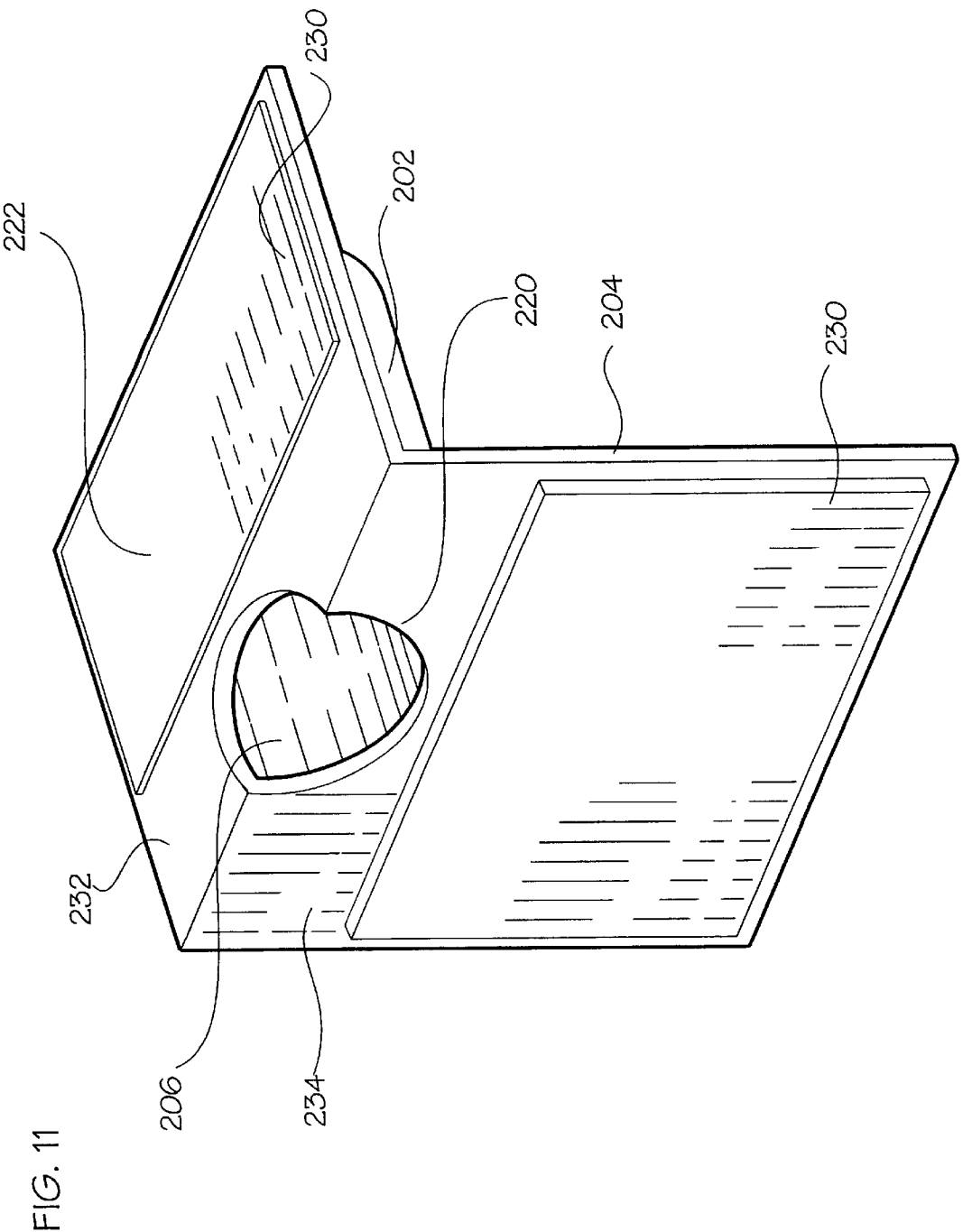
FIG. 11 is a rear schematic perspective view of the second embodiment of the flying insect control device.

Referring now to FIG. 11, flying insect control device 200 also includes the second end 220 which defines a second opening 222 along with adhesive 230 on a portion of first flange area 232 and adhesive 230 on a portion of flange area 234.

In Use

Figure 29:
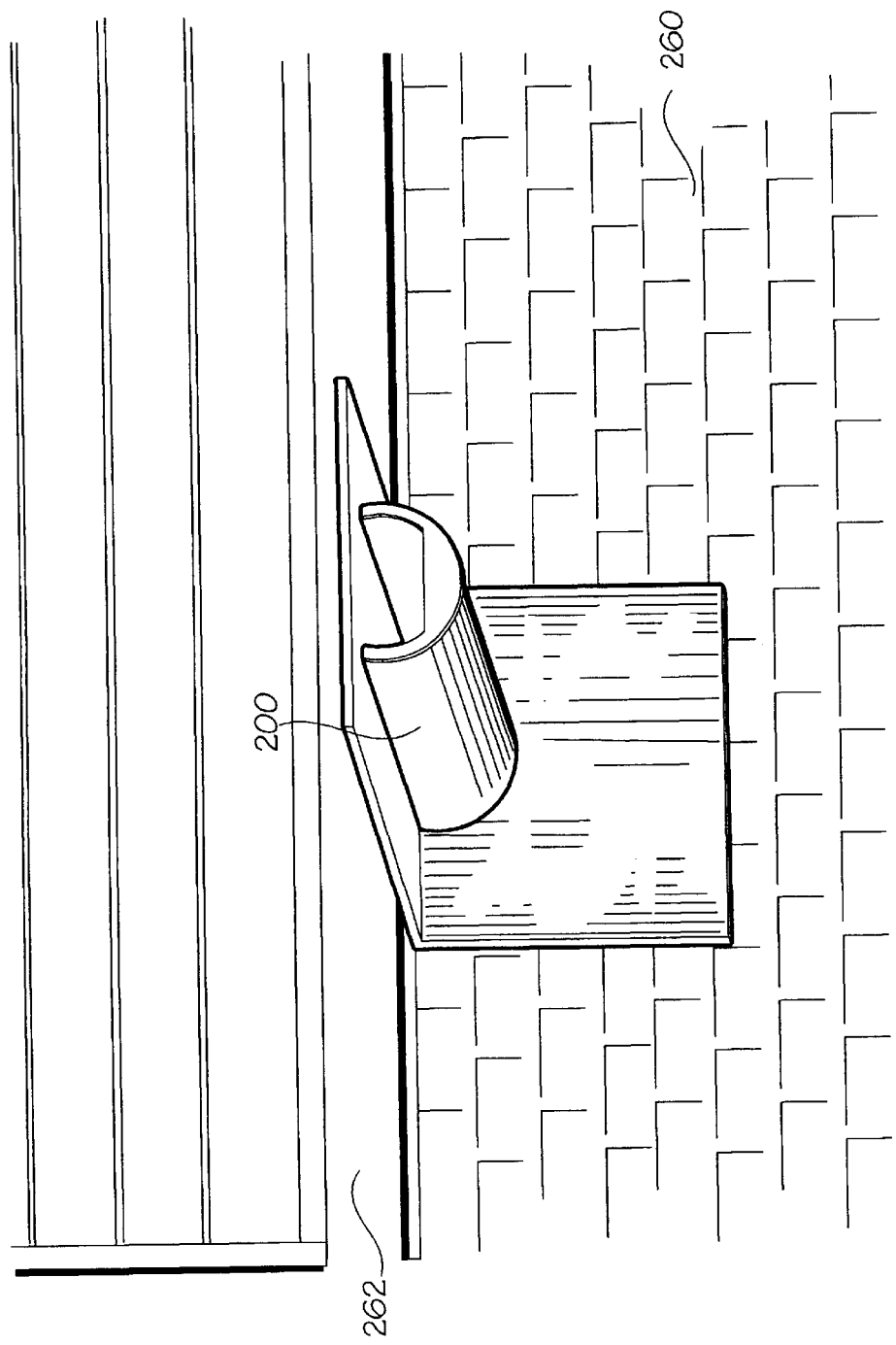
FIG. 29 is a front schematic perspective view of the second embodiment of the flying insect control device shown mounted on a wall and soffit.

Referring now to FIG. 29, flying insect control device is shown mounted, at the intersection of a brick wall 260 and a roof overhang, namely soffit 262. First flange area 232 is adhesively mounted onto soffit 262 and second flange area 234 is adhesively mounted with adhesive 230 onto brick wall 260. Second opening 222 is so positioned to communicate with an insect entrance and exit way which is not shown in FIG. 29 or any of the other diagrams.

The major difference between flying insect control device 200 and flying insect control device 100 as previously described is the fact that passageway 206 is now defined on the bottom by body 202 and on the top, by flange area 232. In addition, flying insect control device 200 includes an L-shaped flange 204 in order to accommodate the intersection of two walls or a wall and a ceiling and/or a wall and a floor, so that second opening 222 can be so positioned to enable it to communicate with an insect entrance and exit way.

In operation, the principles are essentially the same as the flying insect control device 100, namely, first opening 210 is so dimensioned to force a insect wanting to travel through passageway 206 to land in landing area 214 and thereafter ambulate through passageway 206 until it exits out of second opening 222 and thereafter is able to walk or ambulate further into the nest. While travelling through passageway 206, it will come in contact with insecticide 135 which is located along the body bottom 218 portion of body 202 such that an insect travelling through passageway 206 comes in contact with insecticide 135 and carries the insecticide into the nest.

The advantage of flying insect control device 100 is that it can be positioned properly near the intersection of two walls, a wall and ceiling or a wall and floor so as to be able to position the second opening 222 adjacent an insect entrance way or exit way.

Third Embodiment

Figure 15:
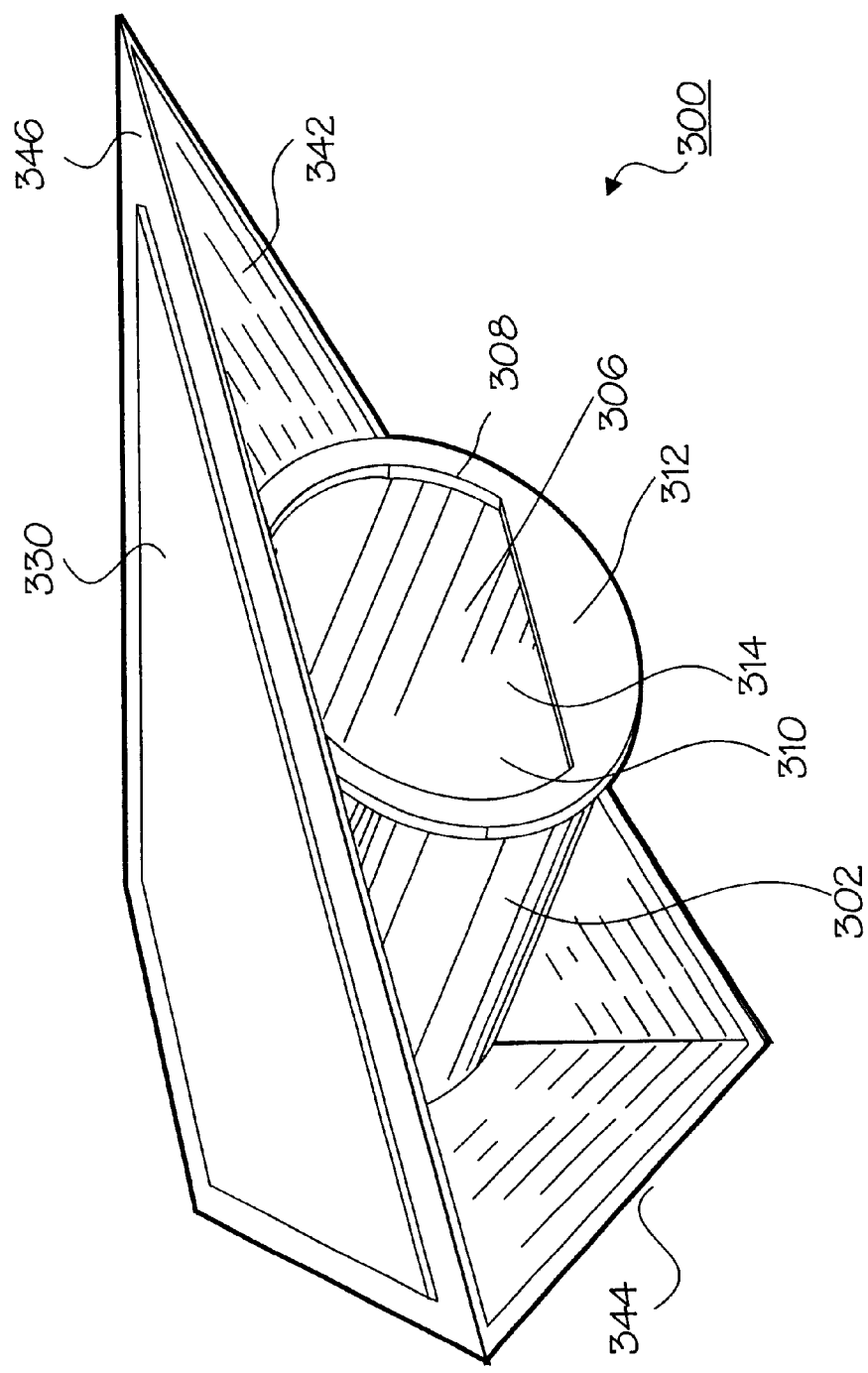
FIG. 15 is a schematic front perspective view of the third embodiment of the flying insect control device.

The third embodiment is shown in FIGS. 12 to 16 and FIG. 30. This embodiment is a modification of flying insect control device 100 and is depicted and shown in FIGS. 12 through 16 as well as FIG. 30 as flying insect control device 300. This embodiment is particularly suited for mounting flying insect control device 300 in corners where three walls intersect, namely where two walls and ceiling intersect or where two walls and a floor come to a three point intersection. Referring now to FIG. 15 in particular, flying insect control device 300 includes the following major components, body 302, first flange 342, second flange 344, third flange 346, passageway 306, first end 308, first opening 310, lip 312, landing area 314 and adhesive 330 located on the exterior portion of each of the three flanges 342, 344 and 346 mentioned above.

Referring now FIG. 16 which is a rear perspective view of flying insect control device 300 and it further includes second opening 322 at a second end 320 defining an exit or entry way for passageway 306.

In Use

Figure 30:
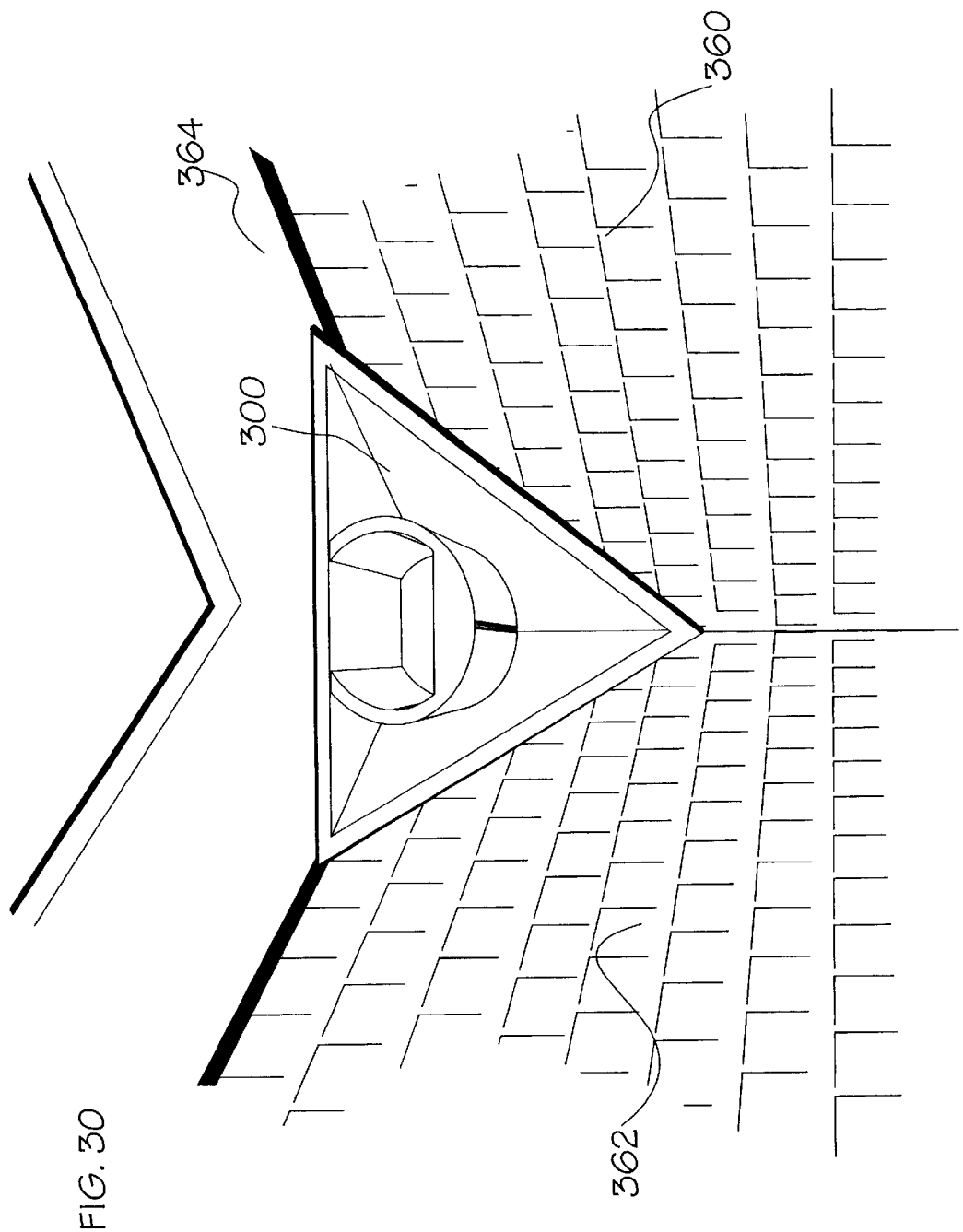
FIG. 30 is a front perspective view of the third embodiment of the flying insect control device shown mounted where two walls and a soffit meet.

Referring now to FIG. 30, flying insect control device 300 is shown mounted at the intersection of brick wall 360, second brick wall 362 and soffit 364. One can see that flying insect control device 300 is so mounted such that second opening 322 is in communication with a insect entrance and exit way which is close to or proximate the intersection of the brick wall 360, brick wall 362 and soffit 364, such that insects can enter and exit through insect entrance way and exit way through passageway 306 defined by insect control device 300.

The method of operation and the method for control of insects and the method for entry and exit of insects into and out of insect control device 300 is analogous to the other two embodiments mentioned above and in particular is analogous to flying insect control device 100 above.

Fourth Embodiment

FIGS. 17 through 27 and FIG. 31 describe and depict the fourth embodiment, namely flying insect control device 400. This particular modification of the flying insect control device is suited for placement of flying insect control device 400 in an area where there is a small unevenness or a step in the walls, ceiling or floor where one wants to place the insect control device onto.

Referring now particularly to FIGS. 23 and 24, insect control device 400 includes the following major components, namely lower section 401, cooperatively engaging and telescoping with upper section 403 as depicted in FIGS. 25, 26 and 27. Flying insect control device 400, includes lower body 402, lower flange 404, passageway 406, first end 408, first opening 410, lip 412, landing area 414, upper body 490 of upper section 403, and upper flange 492, also part of upper section 403.

Referring now to FIGS. 25, 26 and 27, although not completely shown, second end 420 of lower body 402, together with second end of upper body 490, define second opening 422, analogous and similar to second opening 122 of the flying insect control device shown as 100.

One sees from FIGS. 25, 26 and 27 that upper body 490 and lower body 402 are dimensioned such that upper body 490, cooperatively snaps and mounts onto lower body 402 and telescopically can move along a longitudinal direction of lower body 402, namely along the direction of passageway 406.

For example FIG. 25, shows upper body 490 extended such that upper flange 492 and lower flange 404 are coplanar and essentially in this configuration as shown in FIG. 25, flying insect control device 400 is analogous to flying insect control device 100 and operates in an analogous fashion.

Figure 31:
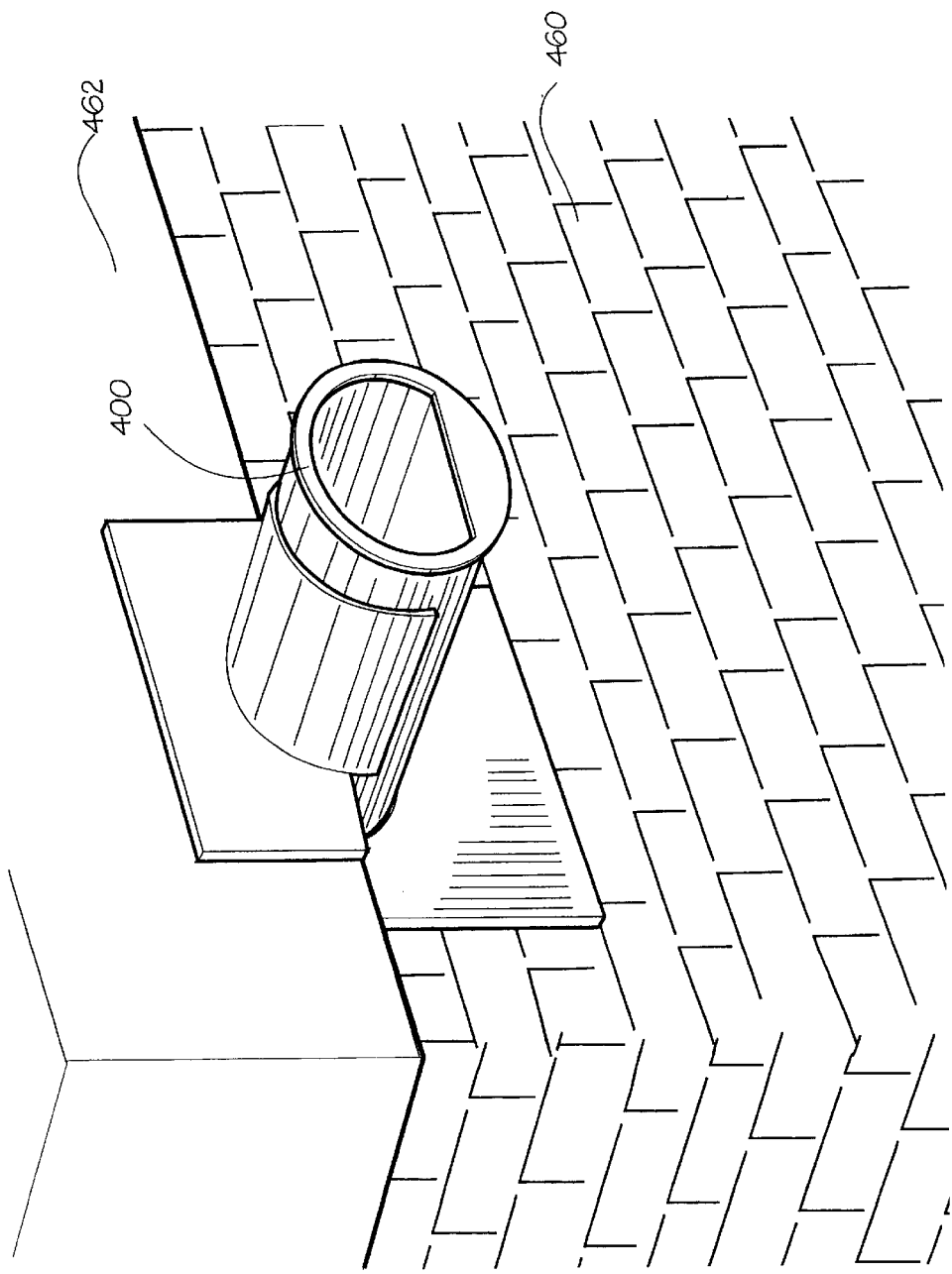
FIG. 31 is a front schematic perspective view of the fourth embodiment of the flying insect control device shown mounted partially on a wall and partially on siding spaced parallel to each other.

The flexibility of insect control device 400 becomes apparent as one looks to FIG. 26, wherein upper body 490 is retracted, such that upper flange 492 and lower flange 404 are lying along two distinct planes which are parallel but spaced from one another. Referring now to FIG. 31, which shows lower flange 404 of flying insect control device mounted onto a wall and upper flange 492 of flying insect control device 400 mounted onto a piece of siding 462 which are on two different, however parallel planes to each other. In this manner second opening 422 can be so positioned to communicate with an insect entry and exit way which may be found under the step portion of siding 462 and wall 460 and/or very close to the step portion of siding 462 and wall 460.

By sliding upper section 403 relative to lower section 401, along lower body 402, in the direction of passageway 406, one can accommodate various depths or sizes of steps between two parallel and planer surfaces.

Adhesive 430 is used to adhesively mount upper flange 492 and lower flange 404 onto whatever surface one desires.

The operation and method for controlling insects is analogous to that described in the diagrams and narrative for flying insect control device number 100 and therefore need not be repeated here.

It should be apparent to persons skilled in the arts that various modifications and adaptation of this structure described above are possible without departure from the spirit of the invention the scope of which defined in the appended claim.

I claim:

1. A flying insect control device for placement over an entrance or exit way used by insects, said flying insect control device comprising:
   (a) a body having a first end defining a first opening and a second end defining a second opening, said openings connected with a passageway;
   (b) a means for mounting said body over an insect entrance or exit way such that said passageway is in communication with said insect entrance or exit way; and
   (c) said passageway dimensioned to compel flying insects to land at a landing area defined at said first end of said body and further compels insects to ambulate through said passageway laced with insecticide
   (d) wherein said body includes an upper body slidably connected to a lower body such that said upper and lower body are slidably movable apart for mounting said flying insect control device onto two flat surfaces, said surfaces being parallel but spaced apart from each other; and
   (e) wherein said upper body includes an upper flange and said lower body includes a lower flange wherein each flange extends transversely to said passageway such that said upper flange is capable of being mounted on one surface and said lower flange capable of being mounted on a second surface wherein said surfaces being parallel but spaced apart from each other.

2. The flying insect control device claimed in claim 1 wherein said body includes a means for retaining said insecticide within said passageway.

3. The flying insect control device claimed in claim 2 wherein said upper and lower body define a longitudinally oriented tubular section with first and second openings proximate each end respectively and said retaining means including lips extending transversely from each distal end of said tubular section and dimensioned to retain liquid within said tubular section.

4. The flying insect control device claimed in claim 1 wherein said flanges includes adhesive for adhesively mounting said device onto a flat surface.

* * * * *